No. 846,688. PATENTED MAR. 12, 1907.
P. McEVOY.
INCLOSURE FOR POULTRY.
APPLICATION FILED MAR. 13, 1906. RENEWED JAN. 7, 1907.
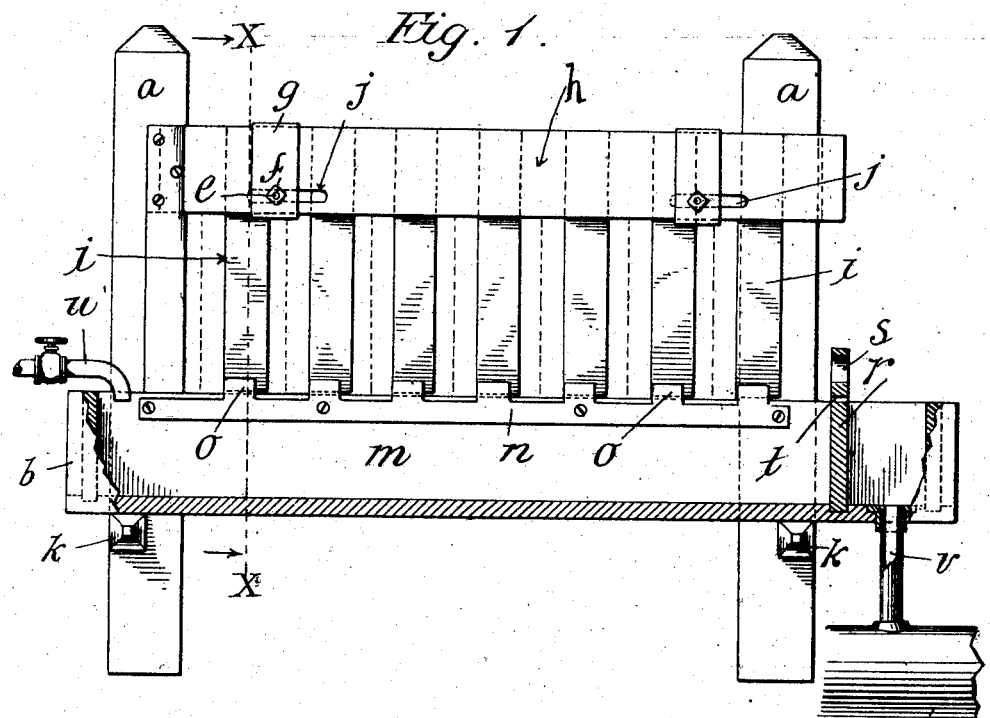
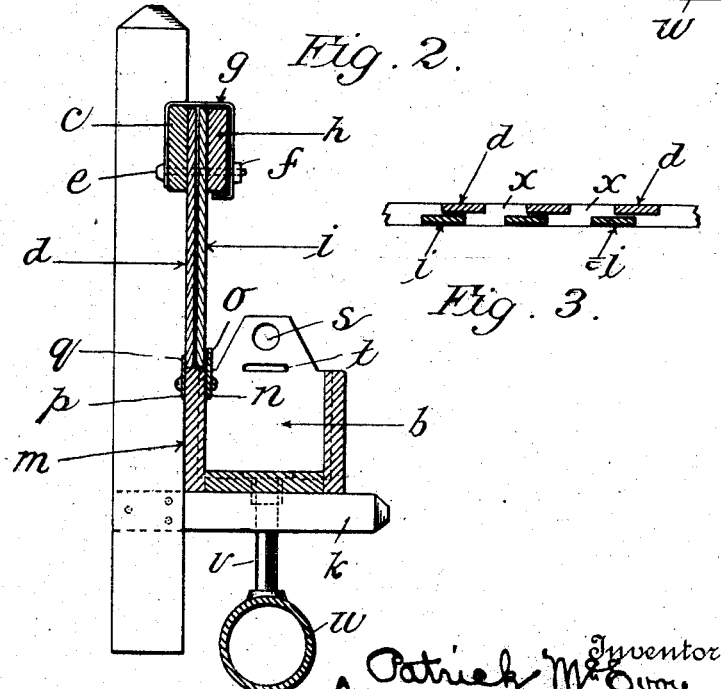

UNITED STATES PATENT OFFICE.

PATRICK McEVOY, OF OIL CITY, PENNSYLVANIA.

INCLOSURE FOR POULTRY.

No. 846,688.  Specification of Letters Patent.  Patented March 12, 1907.

Application filed March 13, 1906. Renewed January 7, 1907. Serial No. 351,227.

*To all whom it may concern:*

Be it known that I, PATRICK McEVOY, a citizen of the United States, residing in Oil City, in the county of Venango and State of Pennsylvania, have invented certain new and useful Improvements in Inclosures for Poultry, of which the following is a specification, reference being had to the accompanying drawing.

My invention relates to improvements in devices for providing young poultry with a continuous supply of fresh drinking-water.

In raising poultry, particularly ducks, it is essential to keep the young birds out of the water provided for them to drink, for nothing will so soon cause disease among the birds than the drinking of impure water and the wetting of feathers forming the first coat in young poultry.

In order to adapt the inclosure for use with birds of various ages or to make the same inclosure serve for the same brood as the birds grow older and larger, means are provided for varying the size of the openings through which the birds pass their heads to reach the watering-trough and for retaining the parts of the inclosure in adjusted position.

Suitable means are provided for expeditiously cleaning out the watering-trough, which is connected with the sewer or other underground conduit, thereby avoiding the formation of stagnant pools around and near the inclosure.

The object of my invention is to provide an inclosure for poultry which is fitted with a suitable trough and which is adjustable for different sizes of poultry.

In the drawings illustrating the principle of my invention and the best mode now known to me of applying that principle, Figure 1 is a front elevation, part of the trough being in sectional view. Fig. 2 is a sectional view on line X X of Fig. 1, the rear and sides of the inclosure being omitted; and Fig. 3 is a sectional detail hereinafter referred to.

$a$ $a$ are corner-posts which are sunk a suitable distance in the ground and which support the trough $b$ and the slatted portions which form the front of the inclosure. The other three sides of the inclosure are not shown or described herein, as they may be of any suitable construction. To the posts $a$ are secured the ends of a cross-beam $c$, from which depend the stationary slats $d$, and through the cross-beam $c$ pass the bolts $e$, provided with nuts $f$ and serving to hold the straps $g$ and the movable beam $h$ in position. From the movable beam $h$ depend the slats $i$, which are wide enough to cover the openings $x$, Fig. 3, between the stationary slats $d$. The movable beam $h$ is formed with slots $j$, through which project the ends of the bolts $e$, said slots permitting the sidewise movement of the beam $h$ on the bolts $e$, as will be readily understood. The straps $g$ serve to hold the movable beam $h$ in position to permit its free movement and also as washers for the nuts $f$.

Projecting from the posts $a$ are the horizontal supports $k$, upon which rests the trough $b$, suitably secured thereto. The lower end of the slats $i$ rubs along the upper edge of the rear side $m$ of the trough $b$. In order to prevent any springing outward of the lower end of the slats $i$, the strap $n$, formed with projections or teeth $o$, is secured to the rear side $m$. The teeth $o$ overlap the lower end of the several slats $i$ and serve to keep them in place. A similar strap $p$, with teeth $q$, may be provided for the slats $d$. (See Fig. 2.)

The trough $b$ is provided with the slide $r$, formed with a hand-hole $s$ and an overflow-hole $t$. This slide serves to hold the water in the trough which is filled from the water-tap $u$ and is emptied through the pipe $v$, connected with the sewer-pipe $w$. By removing the slide $r$ and opening the water-tap $u$ the trough may be flushed and cleared of all dirt and sediment, which will be washed into the sewer-pipe $w$.

The opening $x$, Fig. 3, may be most nicely adjusted so that the bird may be able to pass its head therethrough, but unable to work its body through and get into the trough. As will be readily understood, this adjustment of the opening is made by loosening the nuts $f$ and sliding sidewise the movable beam $h$ on the bolts $e$ until the opening is of the desired size.

The wooden slats $d$ and $i$ are much more preferable than wires, for the latter are sure to cut into the tender flesh of young birds, resulting in the formation of sores and ultimately in the death of the chicken or duckling.

What I claim is—

1. In an inclosure for poultry, the combination of a frame provided with vertically-disposed members separated from one another by openings; a second frame mounted upon said frame free to slide lengthwise and provided with vertically-disposed members, whereby said openings may be covered to any degree; and strap members for binding said frames together.

2. In an inclosure for poultry, the combination of a pair of coöperating supports; a trough mounted thereon; a frame provided with slats and mounted upon said supports, said slats being separated by openings; and a second frame mounted free to slide relatively to the first-named frame and provided with means for covering said openings.

3. In an inclosure for poultry, the combination of a pair of coöperating supports; a trough mounted thereon; a frame provided with slats and mounted upon said supports, said slats being separated by openings; and a second frame mounted free to slide relatively to the first-named frame and provided with slats for covering said openings, said slats rubbing in their movement along the upper edge of the rear side of said trough.

4. In an inclosure for poultry, the combination of a frame with vertically-disposed members separated from one another by openings; a second frame mounted upon said frame free to slide lengthwise and provided with vertically-disposed members, whereby said openings may be covered to any degree; strap members for binding said frames together, and means for holding the second frame in adjusted position.

5. In an inclosure for poultry, the combination of a stationary frame with vertically-disposed members separated from one another by openings; a slidable frame mounted upon said stationary frame free to slide lengthwise and provided with vertically-disposed members, whereby said openings may be covered to any degree; devices mounted in said stationary frame which support the slidable frame during its sliding movement; and means coöperating with said devices for locking said slidable frame in any adjusted position.

PATRICK McEVOY.

Witnesses:
JNO. H. NILSSON,
HAROLD D. BROWN.